United States Patent
Delle Donne

(10) Patent No.: US 8,695,180 B2
(45) Date of Patent: Apr. 15, 2014

(54) LOCKING CLIP AND SYSTEM

(76) Inventor: Dean Delle Donne, Wading River, NY (US)

( * ) Notice: Subject to any disclaimer, the term of this patent is extended or adjusted under 35 U.S.C. 154(b) by 595 days.

(21) Appl. No.: 12/985,780

(22) Filed: Jan. 6, 2011

(65) Prior Publication Data

US 2012/0174350 A1     Jul. 12, 2012

(51) Int. Cl.
*F16G 15/00* (2006.01)
*F16G 15/04* (2006.01)
*A01K 91/03* (2006.01)

(52) U.S. Cl.
USPC ........... 24/600.4; 24/580.1; 24/908; 43/44.83

(58) Field of Classification Search
USPC ........ 24/369–371, 373, 374, 457, 504, 574.1, 24/577.1, 578.14, 580.1, 580.11, 600.4, 24/601.8, 663, 707.9, 708, 708.4, 708.8, 24/713.9–714.2, 908, DIG. 53–DIG. 54, 24/DIG. 56–DIG. 59; 43/43.1, 43.13, 43/43.15, 44, 83, 44.92; 59/85; 63/21, 38; 403/192, 221, 223
See application file for complete search history.

(56) References Cited

U.S. PATENT DOCUMENTS

| | | | | |
|---|---|---|---|---|
| 312,105 | A * | 2/1885 | Faivre | 24/373 |
| 627,892 | A * | 6/1899 | Bartel | 24/598.7 |
| 632,200 | A * | 8/1899 | Pflueger | 59/95 |
| 724,362 | A * | 3/1903 | Wilson | 24/600.4 |
| 731,023 | A * | 6/1903 | Cooper | 24/601.7 |
| 794,979 | A * | 7/1905 | Haverly | 24/601.8 |
| 905,731 | A * | 12/1908 | Merrill | 70/459 |
| 952,615 | A * | 3/1910 | Harkins | 43/44.86 |
| 1,027,041 | A * | 5/1912 | Gammelgaard | 63/21 |
| 1,114,289 | A * | 10/1914 | Rittenhouse | 59/85 |
| 1,154,987 | A * | 9/1915 | Goff | 59/85 |
| 1,182,471 | A * | 5/1916 | Frost | 24/600.4 |
| 1,347,515 | A * | 7/1920 | Lutz | 24/663 |
| 1,399,946 | A * | 12/1921 | Erickson | 59/85 |
| 1,497,710 | A * | 6/1924 | Cole | 24/577.1 |
| 1,515,849 | A * | 11/1924 | Eppinger | 43/42.19 |
| 1,546,701 | A * | 7/1925 | Bailer | 43/43.13 |
| 1,713,041 | A * | 5/1929 | Fey | 43/44.86 |
| 1,719,662 | A * | 7/1929 | Jones | 24/600.4 |
| 1,771,427 | A * | 7/1930 | Waterhouse | 24/600.4 |
| 1,909,896 | A * | 5/1933 | Reyburn | 152/243 |
| 1,925,816 | A * | 9/1933 | Oster | 24/580.1 |
| 2,062,245 | A * | 11/1936 | Arens | 24/601.8 |
| 2,495,348 | A * | 1/1950 | Roed | 24/600.4 |
| 2,676,380 | A * | 4/1954 | Lindquist et al. | 24/601.7 |
| 2,732,652 | A * | 1/1956 | Parks | 43/44.83 |

(Continued)

*Primary Examiner* — Robert J Sandy
*Assistant Examiner* — Tyler Johnson
(74) *Attorney, Agent, or Firm* — Carter, DeLuca, Farrell & Schmidt LLP

(57) ABSTRACT

A locking clip for securing one or more objects thereon includes a loop portion and a sleeve. The loop portion defines first and second ends interconnected by first and second intermediate segments. The first intermediate segment includes a gap defined therein. The sleeve is disposed about the first and second intermediate segments between the first and second ends of the loop portion. The sleeve is rotatable relative to the loop portion between a closed position, wherein the sleeve extends completely along a length of the gap to inhibit passage of the object(s) therethrough, and an open position, wherein the sleeve extends only partially along the length of the gap to permit passage of the object(s) therethrough. The loop portion and/or the sleeve also includes a feedback feature configured to produce an audible and/or a tactile feedback response when the sleeve is rotated to the closed and/or the open position.

20 Claims, 4 Drawing Sheets

(56) References Cited

U.S. PATENT DOCUMENTS

| | | | |
|---|---|---|---|
| 2,756,478 A * | 7/1956 | Morrissey | 24/601.1 |
| 2,814,086 A * | 11/1957 | Bahr | 24/601.7 |
| 3,004,319 A * | 10/1961 | Hennon | 24/598.5 |
| 3,354,523 A * | 11/1967 | Roche et al. | 24/601.8 |
| 3,365,760 A * | 1/1968 | Kammerer | 24/600.9 |
| 3,408,701 A | 11/1968 | Decker | |
| 3,491,477 A * | 1/1970 | Karras et al. | 43/44.84 |
| 4,090,318 A | 5/1978 | Webster | |
| 4,733,441 A * | 3/1988 | Buchanan | 24/580.1 |
| 4,884,355 A | 12/1989 | Neihoff et al. | |
| 5,042,191 A | 8/1991 | Fett | |
| D334,792 S | 4/1993 | Flemming | |
| 5,301,454 A * | 4/1994 | Chen | 43/42.74 |
| 5,608,985 A | 3/1997 | Kainec | |
| 5,655,329 A | 8/1997 | Yong-Set | |
| 6,088,884 A * | 7/2000 | Hentz | 24/265 R |
| 6,141,839 A | 11/2000 | Yong-Set | |
| 6,681,598 B2 * | 1/2004 | Cheng | 63/3.1 |
| 7,152,362 B2 | 12/2006 | Holbrook | |
| 7,621,071 B2 * | 11/2009 | Brasseur | 43/44.97 |
| 7,832,139 B1 * | 11/2010 | Christensen | 43/44.87 |
| 2008/0309079 A1 | 12/2008 | Pedersen et al. | |
| 2012/0174350 A1 * | 7/2012 | Delle Donne | 24/457 |

* cited by examiner

LOCKING CLIP AND SYSTEM

BACKGROUND

1. Technical Field

The present disclosure relates to a locking clip. More particularly, the present disclosure relates to locking clips that provide audible and/or tactile feedback to the user upon transitioning of the clip between an open condition and a closed condition as well as systems for use therewith.

2. Description of Related Art

Clips are commonly used, for example, to releasably secure fishing hooks, weights, or lures to a fishing line, obviating the need to cut and re-tie the line each time it is desired to change the hook or lure. A typical clip for attaching a fishing line to a hook or lure includes a wire loop that is capable of transitioning between an open condition, for positioning of the hook or lure about the clip, e.g., for inserting an open end of the clip through an aperture define through the hook or lure, and a closed condition, for securing the hook or lure to the clip, e.g., for inhibiting disengagement of the hook or lure from the clip. Examples of such clips are disclosed in U.S. Pat. Nos. 5,042,191, 5,655,329, and 6,141,839, each of which will be addressed in turn hereinbelow.

U.S. Pat. No. 5,042,191 discloses a metallic wire clip that includes first and second free ends that overlap one another in a closed condition. When the clip is squeezed together, the first and second free ends are moved apart to an open condition, allowing the hook or lure to be attached to the clip.

U.S. Pat. No. 5,655,329 discloses a clip formed from a resilient wire that includes a free end having a u-shaped hook. The clip is transitionable between a closed condition, wherein the u-shaped hook is engaged with a central support member of the clip to close the loop of the clip, and an open condition, wherein the u-shaped hook is disengaged from the central support member.

U.S. Pat. No. 6,141,839 discloses a clip formed from corrosion-resistant wire that includes a free end having a u-shaped hook. Similar to U.S. Pat. No. 5,655,329, discussed above, the clip is transitionable between a closed condition, wherein the u-shaped hook is engaged with a central support member, and an open condition, wherein the u-shaped hook is disengaged from the central support member.

However, a need still exists for a locking clip capable of an easy and efficient transition between an open condition and a closed condition without requiring a wire-to-wire engagement, or significant deformation of the wire, since corrosion and/or change in resiliency, e.g., increased rigidity, of the wire may interfere with the operation of the clip. An easily and efficiently transitionable clip would also be readily useable for someone with limited digital dexterity, in adverse weather conditions, or in any other situation that may reduce the user's ability to manipulate the locking clip.

Further, a need exists for a locking clip capable of transitioning between an open condition and a closed condition and providing feedback, e.g., audible or tactile feedback, to the user, alerting the user as to the position of the clip, e.g., whether the clip is in the open and/or the closed condition. As can be appreciated, the relatively rapidity with which hooks and lures are changed, and the relatively small size of locking clips makes reliance on visual verification as to the condition of the clip difficult. A locking clip providing audible and/or tactile feedback would also provide the advantage of being able to be used in dark conditions, or where there is reduced visibility.

SUMMARY

In accordance with one embodiment of the present disclosure, a locking clip for releasably securing one or more objects thereon is provided. The locking clip includes a loop portion and a sleeve. The loop portion defines first and second ends that are interconnected by first and second intermediate segments. The first intermediate segment includes a gap defined therein. The gap is configured to permit passage of one or more objects therethrough for securing of the object(s) to the loop portion. The sleeve is disposed about the first and second intermediate segments of the loop portion between the first and second ends of the loop portion. The sleeve is rotatable relative to the loop portion between a closed position and an open position. In the closed position, the sleeve extends completely along a length of the gap to inhibit passage of the object(s) through the gap. In the open position, on the other hand, the sleeve extends only partially along the length of the gap to permit passage of the object(s) through the gap, e.g., to secure the objects(s) to the loop portion. The loop portion and/or the sleeve includes a feedback feature configured to produce an audible and/or a tactile feedback response when the sleeve is rotated to the closed position and/or the open position.

In one embodiment, the sleeve defines a first length along a first side thereof and a second length along a second side thereof. The first length is greater than the length of the gap and the second length is smaller than a length of the gap such that, when the sleeve is positioned with the first side thereof extending along the gap, the sleeve is disposed in the closed position, and such that, when the sleeve is rotated such that the second side thereof extends along the gap, the sleeve is disposed in the open position. More specifically, the sleeve may define an angled tip at one end thereof that angles from the first side thereof to the second side thereof such that the length of the sleeve along the first side, e.g., the first length, is greater than the length of the sleeve along the second side, e.g., the second length.

In another embodiment, the sleeve is rotatable approximately 180 degrees in either direction relative to the loop portion to transition the sleeve between the closed position and the open position.

In another embodiment, the sleeve includes one or more engagement members defined therein, while the first intermediate segment and/or the second intermediate segment of the loop portion includes a complementary engagement member configured to engage the engagement member of the sleeve upon rotation of the sleeve to the closed position and/or the open position. Accordingly, upon engagement between the engagement member(s) and the complementary engagement member(s), the sleeve is retained in the closed position and/or the open position.

In yet another embodiment, engagement between the engagement member(s) and the complementary engagement member(s) and/or disengagement between the engagement member(s) and the complementary engagement member(s) produces the audible and/or tactile feedback response, e.g., to alert the user as to the relative position of the sleeve.

In still another embodiment, the engagement member(s) of the sleeve is an aperture defined therein. In such an embodiment, the complementary engagement member(s) of the first intermediate segment and/or the second intermediate segment is a protrusion configured for releasable engagement within the aperture.

In yet another embodiment, the first end of the loop portion defines a generally circular configuration having a first diameter. The second end of the loop portion may similarly define a generally circular configuration having a second diameter. The first and second diameters of the first and second ends, respectively, of the loop portion may be different, e.g., one may be larger than the other, or they may be substantially equal to one another.

In another embodiment, the object is permitted to pass through the gap and into the first end of the loop portion when the sleeve is disposed in the open position.

In yet another embodiment, the first and second intermediate segments of the loop portion define generally linear configurations. Further, the first and second intermediate segments may be substantially parallel relative to one another.

In still another embodiment, the loop portion is formed from a single piece of wire stock. The sleeve may be formed from a non-corrosive material and/or a flexible material. Further, the sleeve may be formed from a transparent material, such that the user may visually confirm the position of the sleeve relative to the loop portion.

In still yet another embodiment, the feedback feature of the loop portion and/or the sleeve produces both an audible feedback response and a tactile feedback response when the sleeve is rotated to the closed position and/or the open position.

BRIEF DESCRIPTION OF THE DRAWINGS

Various illustrative embodiments of the present disclosure are described herein with reference to the drawings, wherein.

DETAILED DESCRIPTION

Figure 1:
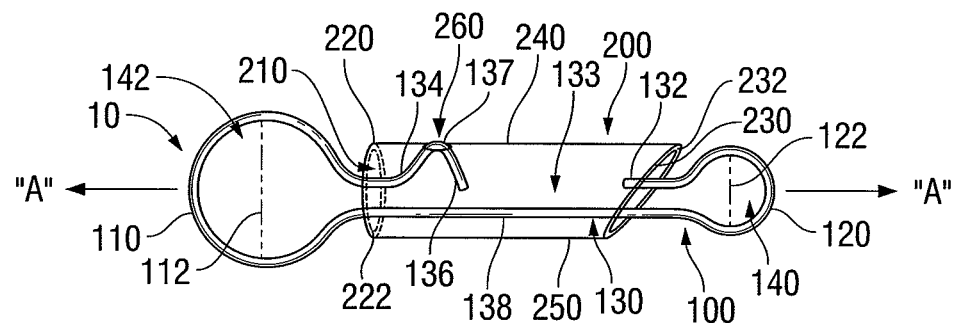
FIG. 1 is a side view of one embodiment of a locking clip provided in accordance with the present disclosure.
Figure 4:
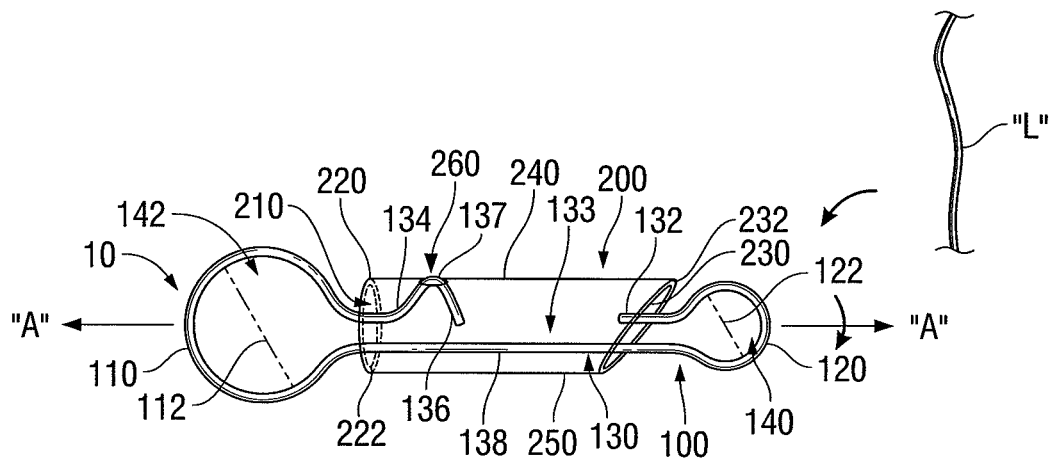
FIG. 4 is a side view of the locking clip of FIG. 1 shown in a closed position prior to engagement of an object, e.g., a fishing line, thereon.

Turning now to FIG. 1, one illustrative embodiment of a locking clip provided in accordance with the present disclosure is shown generally identified by reference numeral 10. Locking clip 10 includes a loop portion 100 and a sleeve 200 disposed about loop portion 100. As will be described in greater detail below, sleeve 200 is rotatable about longitudinal axis "A-A" and relative to loop portion 100 between an open position (FIG. 5) and a closed position (FIGS. 4 and 6). In the open position, an object, e.g., a fishing line "L" (see FIGS. 4-6), may be inserted into and/or removed from loop portion 100, while, in the closed, or locked position, the fishing line "L" (FIGS. 4-6) is retained in engagement with loop portion 100.

Figure 2:
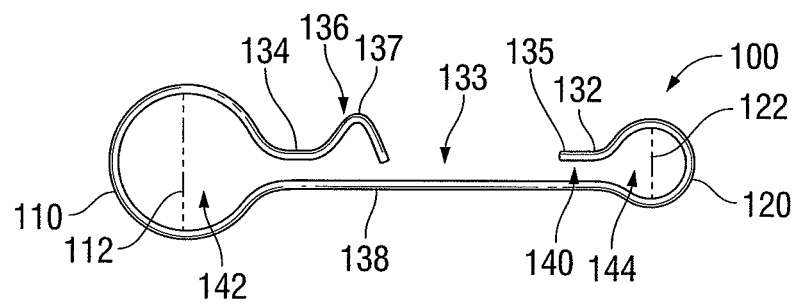
FIG. 2 is a side view of the loop portion of the locking clip of FIG. 1.

Loop portion 100, as best shown in FIG. 2, may be formed from metal wire stock, or any other suitable material, e.g., a non-corrosive metal, and generally includes a first end 110, a second end 120, and an intermediate section 130 interconnecting the first and second ends 110, 120, respectively. Loop portion 100 further defines a longitudinal axis "A-A" and includes an elongated aperture 140 defined therethrough and extending along longitudinal axis "A-A." As can be appreciated, first and second ends 110, 120, respectively, of loop portion 100, define the longitudinal bounds, i.e., the lateral bounds, of aperture 140, while first and second intermediate segments 132, 138, respectively, of intermediate section 130 define the upper and lower bounds, respectively, of aperture 140. As will be described in greater detail below, one of the first and second intermediate segments, e.g., first intermediate segment 132, defines a gap 133 therein that is configured to permit insertion of a fishing line "L" (FIGS. 4-6) or other object into elongated aperture 133, e.g., for releasably engaging the fishing line "L" (FIGS. 4-6) within loop portion 100 (see FIGS. 5-6). In other words, with gap 133 defined within first intermediate segment 132, loop portion 100 is not continuous, but, rather, defines a disconnected configuration to permit positioning of an object, e.g., fishing line "L" (FIGS. 4-6), therethrough.

With continued reference to FIG. 2, first end 110 of loop portion 100 of locking clip 10 defines a substantially circular-shaped configuration having a first diameter 112, although other configurations, e.g., oval, may also be provided. Second end 120 of loop portion 100 similarly defines a substantially circular-shaped configuration defining a second diameter 122. As shown in the Figures, first diameter 112 of first end 110 of loop portion 100 may be larger than second diameter 122 of second end 120 of loop portion 100, although it is also envisioned that first and second diameters 112, 122, of first and second ends 110, 120, respectively, be equal, or that second end 120 define a second diameter 122 that is larger than first diameter 112 of first end 110.

Continuing with reference to FIG. 2, and as mentioned above, first and second intermediate segments 132, 138, respectively, of intermediate section 130 of loop portion 100 interconnect the first and second ends 110, 120, respectively, of loop portion 100. Further, first and second intermediate segments 132, 138, respectively, may define substantially linear configurations and may be spaced-apart relative to one another in a substantially parallel orientation with respect to longitudinal axis "A-A" and, thus, with respect to one another. However, other configurations are also contemplated. As best shown in FIG. 2, first intermediate segment 132 includes a first end portion 134 extending from first end 110 of loop portion 100 and a second end portion 136 extending from second end 120 of loop portion 100. First and second end portions 134, 135, respectively, of first intermediate segment 132 are disjointed, or disconnected from one another, such that a gap 133 is defined therebetween. An engagement member 136 defining a protrusion 137, e.g., an outwardly extending bump, or hump in the wire stock, may be defined at first end portion 134 of first intermediate section 132 adjacent gap 133 such that, as will be described in greater detail below, sleeve 200 may be retained in either or both of the open and closed conditions relative to loop portion 100. Further, protrusion 137 of engagement member 136 may be configured, in cooperation with sleeve 200, to provide an audible and/or tactile feedback response upon rotation of sleeve 200 to the open and/or the closed position, thereby alerting the user as to the relative position of the sleeve 200.

Figure 3:
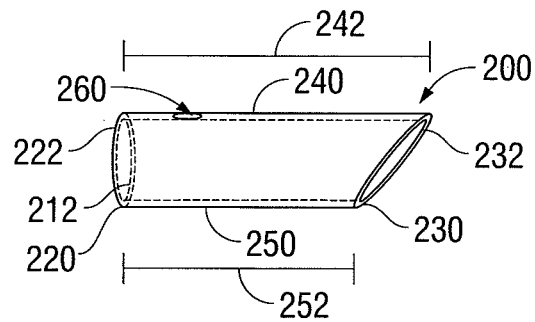
FIG. 3 is a side view of the sleeve of the locking clip of FIG. 1.

Turning now to FIG. 3, in conjunction with FIG. 1, sleeve 200 defines a generally cylindrical configuration having a lumen 210 extending longitudinally therethrough. Sleeve 200 may be formed from any suitable flexible, non-corrosive material, e.g., a plastic, or rubber. Sleeve 200 may also be formed from a transparent material, to permit visualization therethrough. As mentioned above, sleeve 200 is disposed about loop portion 100 and is configured for rotation about longitudinal axis "A-A" and relative to loop portion 100 between an open position and a closed position. More specifically sleeve 200 is disposed about intermediate section 130 of loop portion 100, between first and second ends 110, 120, respectively, of loop portion 100, such that first and second intermediate segments 132, 138 of loop portion 100 extend through lumen 210 of sleeve 200. Further, lumen 210 of sleeve 200 may define a diameter 212 smaller than the first and second diameters 112, 122, of first and second ends 110, 120, respectively, of loop portion 100, such that sleeve 200 is retained in a substantially fixed longitudinal position between first and second ends 110, 120, respectively, of loop portion 100. However, as will be described in greater detail below, sleeve 200 is also configured to be urged, or slid along longitudinal axis "A-A" toward second end 120 of loop portion 100 to permit passage or one or more objects, e.g., attachment line 300 (FIG. 7), into aperture 142 of first end 110 of loop portion 100 for securing attachment line 300 (FIG. 7) thereon.

As best shown in FIG. 1, the diameter 212 of lumen 210 of sleeve 200 is equal to, or slightly smaller than the distance between first and second intermediate segments 132, 138, respectively, of loop portion 100. Accordingly, due to the above configuration, although sleeve 200 is permitted to rotate relative to loop portion 100, sleeve 200 is inhibited from freely rotating, i.e., rotating without active urging by the user, about loop portion 100. In other words, sleeve 200 exerts a compression force on intermediate segments 132, 138 of loop portion 100 to frictionally retain sleeve 200 in position relative to loop portion 100. Thus, in order to rotate sleeve 200 relative to loop portion 100, e.g., between the open and closed positions, sleeve 200 must be rotated with sufficient force to overcome the frictional engagement between loop portion 100 and sleeve 200.

With continued reference to FIGS. 1 and 3, sleeve 200 extends along longitudinal axis "A-A" and includes a first end 220 and a second end 230. Sleeve 200 is configured for positioning about loop portion 100 such that first end 220 of sleeve 200 is disposed adjacent first end 110 of loop portion 100 and such that second end 230 of sleeve 200 is disposed adjacent second end 120 of loop portion 100. Further, first end 110 of sleeve 200 defines a first end surface 222 that is substantially perpendicular to longitudinal axis "A-A," while second end 230 of sleeve 200 defines an angled second end surface 232. More particularly, due to the angled second end surface 232 of sleeve 200, sleeve 200 defines a first length 242 extending between first and second ends 220, 230, respectively, thereof along a first side 240 thereof, and a second length 252, smaller than first length 242, extending between first and second ends 220, 230, respectively, thereof along a second, opposed side 250 thereof.

Sleeve 200 may also include an engagement member, e.g., an aperture 260 defined through the peripheral surface thereof toward first end 220 thereof, configured complementary to protrusion 137 of engagement member 136 of loop portion 100. Aperture 260 may be defined on first side 240 of sleeve 200 (as shown in the Figures), on second side 250 of sleeve 200, or two apertures 260 may be provided, one defined within each of the first and second sides 240, 250, respectively, of sleeve 200. Aperture(s) 260 is releasably engageable with protrusion 137 of loop portion 100 such that sleeve 200 may be retained in either or both of the open and closed position. More specifically, as mentioned above, protrusion 137 of engagement member 136 of first intermediate segment 132 of loop portion 100 extends outwardly from first intermediate segment 132. As such, when protrusion 137 of loop portion 100 is moved into alignment with aperture 260 of sleeve 200, protrusion 137 is automatically urged, or biased into engagement with aperture(s) 260 of sleeve 200, as the compression force on protrusion 137, due to the smaller-diametered sleeve 200 disposed therearound, is released. As can be appreciated, this engagement helps to further secure sleeve 200 in the closed and/or the open position.

Further, as will be described in greater detail below, aperture(s) 260, in cooperation with protrusion 137 of engagement member 136 of loop portion 100, may be configured to provide an audible and/or tactile feedback response upon rotation of sleeve 200 to the open and/or the closed position, thereby alerting the user as to the relative position of the sleeve 200. Additionally, in embodiments where sleeve 200 is formed from a transparent material, the relative position of sleeve 200 with respect to loop portion 100 can also be confirmed visually.

Referring once again to FIG. 1, locking clip 10 is shown in the assembled condition. As shown in FIG. 1, sleeve 200 is disposed about first and second intermediate segments 132, 138, respectively, of intermediate section 130 of loop portion 100, while first and second ends 110, 120, respectively, of loop portion 100 extend longitudinally from opposing ends 220, 230, respectively, of sleeve 200. More particularly, sleeve 200 separates elongated aperture 140 defined through loop portion 100 into a first generally circular aperture 142 at first end 110 of loop portion 100 and a second generally circular aperture 144 at second end 120 of loop portion 100. As mentioned above, these first and second generally circular apertures 142, 144, respectively, may define different, or similar diameters 112, 122, respectively.

Figure 5:
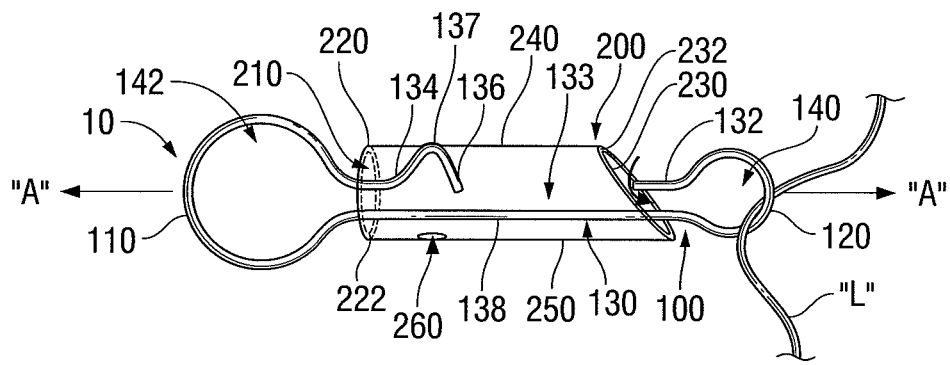
FIG. 5 is a side view of the locking clip of FIG. 1 shown in an open position with the fishing line disposed therethrough thereon.
Figure 6:
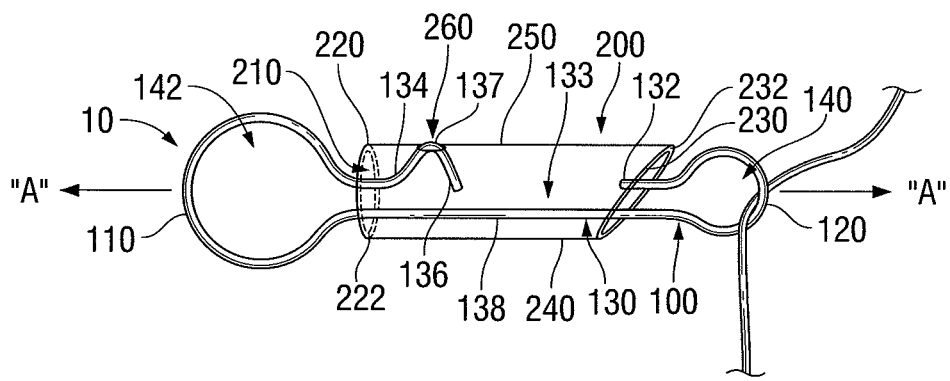
FIG. 6 is a side view of the locking clip of FIG. 1 shown in a closed position with the fishing line disposed therethrough.

Turning now to FIGS. 4-6, the use and operation of locking clip 10 will now be described. Initially, as shown in FIG. 4, locking clip is disposed in the closed position. More particularly, in the closed position, sleeve 200 is positioned such that first side 240 of sleeve 200 is disposed adjacent first intermediate segment 132 of loop portion 100 (and, thus, such that second side 250 of sleeve 200 is positioned adjacent second intermediate segment 138 of loop portion 100). In this position, sleeve 200 extends completely across gap 133 defined within first intermediate segment 132 of loop portion 100 due to the relatively longer length 242 of sleeve 200 along first side 240 thereof (as a result of the angled second end surface 232 of sleeve 200). As such, in the closed position, fishing line "L," is inhibited from passing through gap 133, e.g., into or out of elongated aperture 140 of loop portion 100. Further, in this closed position, protrusion 137 of engagement member 136 of first intermediate segment 132 of loop portion 100 is biased into engagement within aperture 260 defined within sleeve 200, thereby securing, or locking sleeve 200 in the closed position. Other releasable engagement mechanisms (not shown) for releasably securing sleeve 200 in the open and/or closed position relative to loop portion 100 may also be provided.

Turning now to FIG. 5, in order to transition locking clip 10 and, more particularly, sleeve 200 to the open position, the user grasps loop portion 100, e.g., at either of first and second ends 110, 120, respectively, thereof, with one hand and sleeve 200 with the other and rotates sleeve 200 about longitudinal axis "A-A" and relative to loop portion 100 in either direction, e.g., clockwise or counterclockwise, with sufficient force to overcome the engagement of protrusion 137 within aperture 260 and the frictional engagement between sleeve 200 and loop portion 100, discussed above. Further, sleeve 200 and/or engagement member 136 may be configured such that an audible "click" and/or tactile vibration may be produced upon disengagement of protrusion 137 from aperture 260 to alert the user to the fact that sleeve 200 has been rotated from the closed position.

Sleeve 200 is rotated approximately 180 degrees such that second side 250 of sleeve 200 is rotated into position adjacent first intermediate segment 132 of loop portion 100 (and, thus, such that first side 240 of sleeve 200 is positioned adjacent second intermediate segment 138 of loop portion 100). In this open position, due to the relatively shorter length 252 of second side 250 of sleeve 200, sleeve 200 does not extend completely, but only partially, across gap 133 defined within first intermediate segment 132 of loop portion 100, as shown in FIG. 5.

Upon achieving the open position, sleeve 200 and loop portion 100 may be configured to produce an audible "click" and/or tactile vibration to alert the user that locking clip 10 has been moved to the open position. More specifically, sleeve 200 may include an aperture (not shown) defined along second side 250 thereof (similar to aperture 260 of first side 240 of sleeve 200) configured to engage protrusion 137 of loop portion 100. As such, the biasing of protrusion 137 of loop portion 100 into the aperture (not shown) of the second side 250 of sleeve 200, and the flexing of sleeve 200 to permit engagement of protrusion 137 within the aperture (not shown) may cooperate to define the audible "click" and/or tactile vibration to confirm the achievement of the open position. Additionally, in embodiments where sleeve 200 is formed from a transparent material, the user may "double-check" the position of sleeve 200 via visual confirmation.

In this open position, the object, e.g., fishing line "L," may be inserted through gap 133 and into second circular aperture 144 at second end 120 of loop portion 100. More particularly, fishing line "L" (or other suitable object) may be inserted through gap 133 such that fishing line "L" is disposed within and extends through second aperture 144 defined within loop portion 100 of locking clip 10. With fishing line "L" disposed through loop portion 100, locking clip 10 may then be returned to the closed position to retain fishing line "L" therethrough.

With reference now to FIGS. 5 and 6, in order to return locking clip 10 to the closed position to retain fishing line "L" therein, the user once again grasps loop portion 100, e.g., at either of first and second ends 110, 120, respectively, thereof, with one hand and sleeve 200 with the other and rotates sleeve 200 about longitudinal axis "A-A" and relative to loop portion 100 in either direction, e.g., clockwise or counterclockwise, with sufficient force to overcome the frictional engagement between sleeve 200 and loop portion 100 (and, if employed, the engagement of protrusion 137 within the aperture (not shown) defined within second side of sleeve 200). Similarly as above, sleeve 200 is rotated approximately 180 degrees until first side 240 of sleeve 200 is once again disposed adjacent first intermediate segment 132 of loop portion 100 (and, thus, such that second side 250 of sleeve 200 is positioned adjacent second intermediate segment 138 of loop portion 100). In this position, as mentioned above, sleeve 200 extends completely across gap 133 defined within first intermediate segment 132 of loop portion 100 due to the relatively longer length 242 of sleeve 200 along first side 240 thereof (as a result of the angled second end surface 232 of sleeve 200). As sleeve 200 is rotated into this closed position, protrusion 137 of first intermediate segment 132 of loop portion 100 is urged, or biased into engagement with aperture 137 defined along first side 240 of sleeve 200. More particularly, protrusion 137 "pops" or "clicks" into engagement with aperture 260, audibly and tactilely confirming to the user that the closed position has once again been achieved.

As discussed above, in embodiments where sleeve 200 is formed from a transparent material, the user may "double-check" the position of sleeve 200 via visual confirmation.

Further, as mentioned above, the frictional engagement between sleeve 200 and intermediate segments 132, 138 of loop portion 100 and the engagement of protrusion 137 of engagement member 136 of loop portion 100 within aperture 260 of sleeve 200 retains locking clip 10 in this locked, or closed position. The use and operation of locking clip 10 with regard to securing and/or removing objects (not shown) from aperture 142 of first end 110 of loop portion 100 will be described hereinbelow with reference to FIG. 7.

Figure 7:
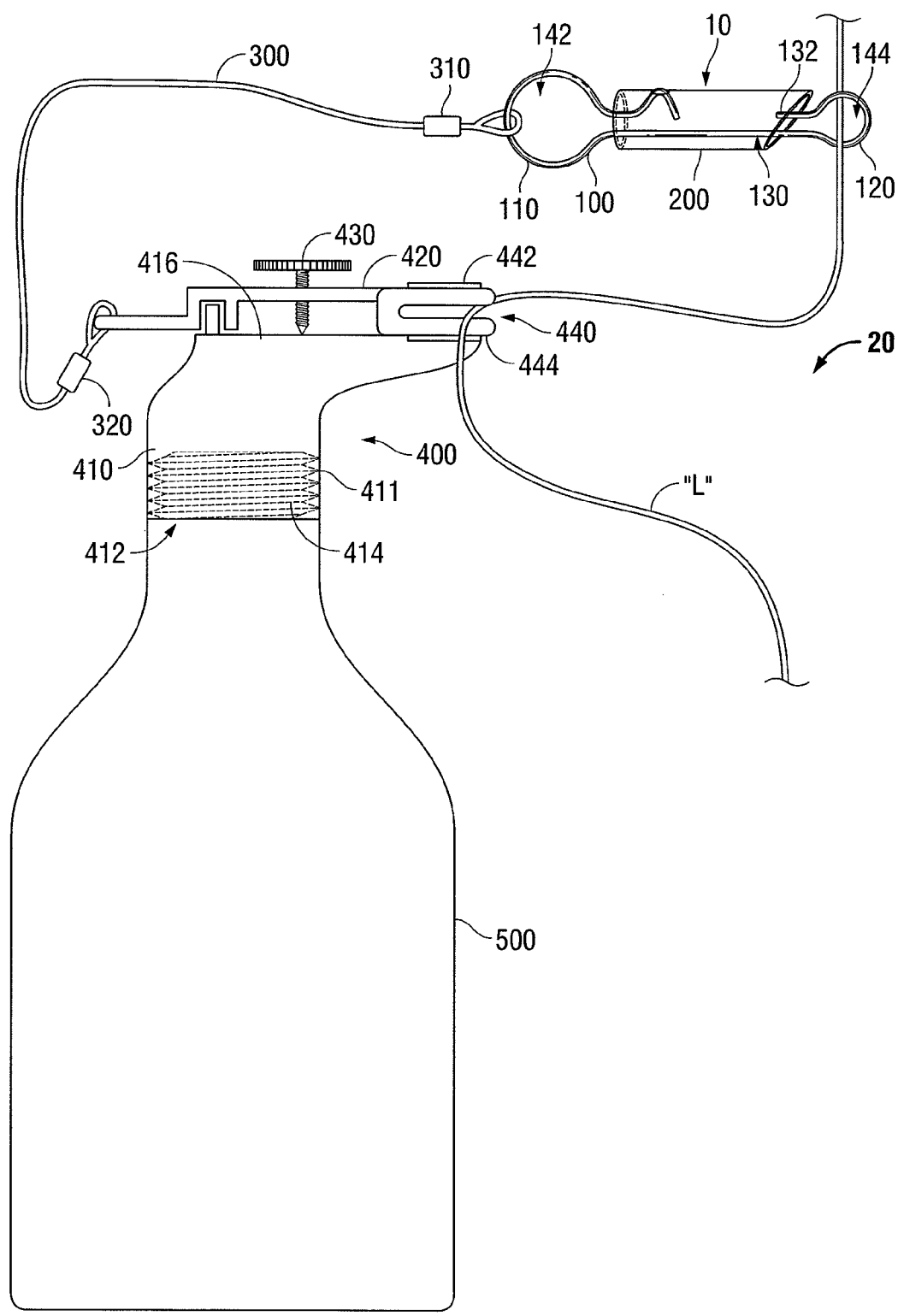
FIG. 7 is a side view of a float system incorporating the locking clip and a float attachment mechanism provided in accordance with the present disclosure.
Figure 8:
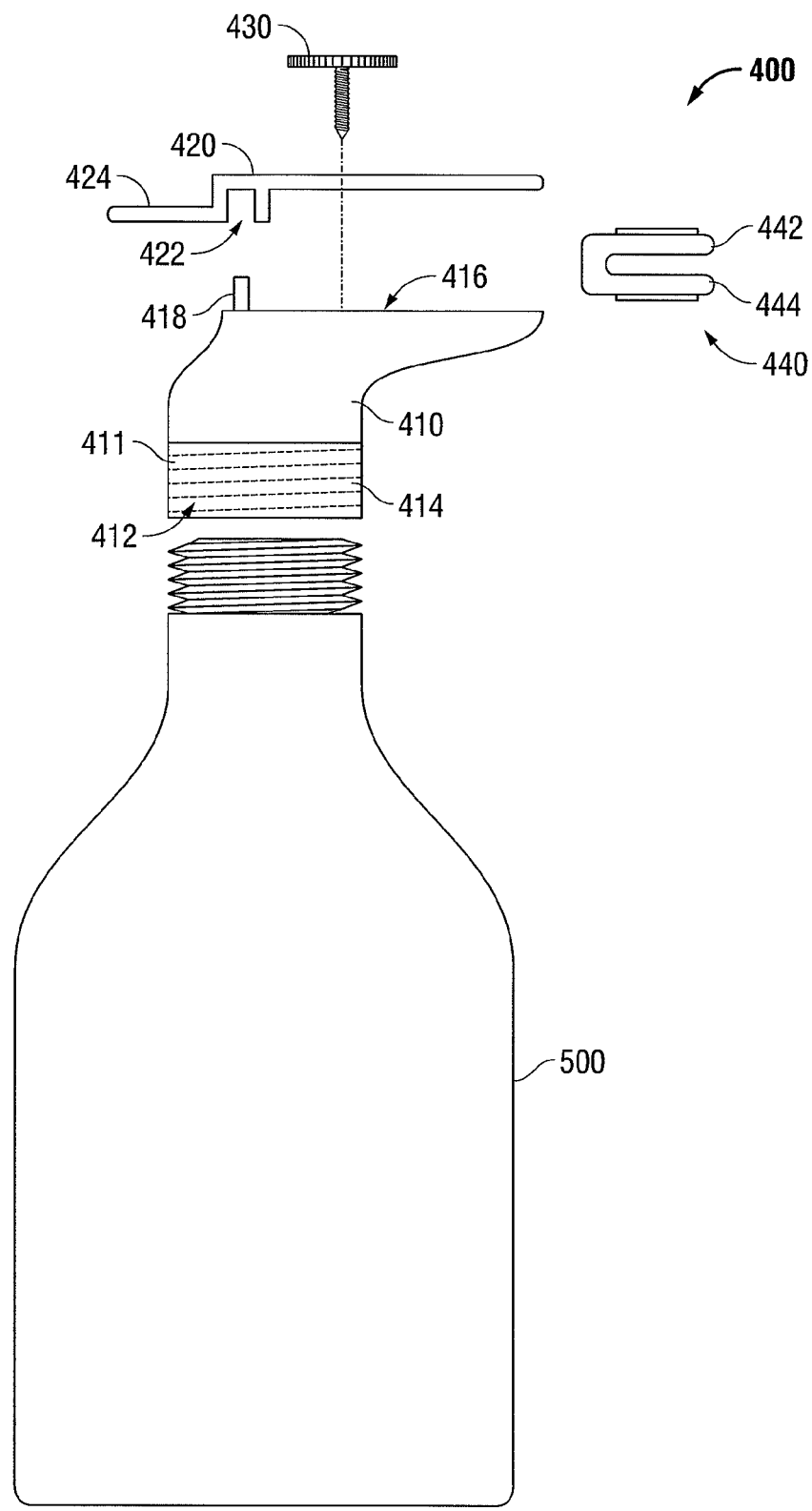
FIG. 8 is an exploded view of the float attachment mechanism of the float system of FIG. 7.

Turning now to FIGS. 7-8, one embodiment of a system incorporating locking clip 10 is shown generally identified as float system 20, although it is envisioned that locking clip 10 may be used in a variety of other systems or settings. Float system 20 generally includes locking clip 10, fishing line "L," float attachment line 300, float attachment mechanism 400, and bottle 500. More specifically, locking clip 10, as described in detail above, is releasably securable to fishing line "L," e.g., by transitioning locking clip 10 to the open position (FIG. 5), inserting fishing line "L" therethrough and then transitioning locking clip 10 back to the closed position (FIG. 6). As can be appreciated, with locking clip 10 secured to fishing line "L," locking clip 10 is permitted to slide along the length of fishing line "L," while remaining secured thereto. Attachment line 300 is secured within first circular aperture 142 of locking clip 10 at a first end 310 thereof and is engaged to float attachment mechanism 400 at a second end 320 thereof. Float attachment mechanism 400, in turn, is releasably engageable with a float 500, e.g., a soda bottle. Float attachment mechanism 400 is also clamped to a portion of fishing line "L" to maintain float 500 in fixed position along fishing line "L." The use and operation of float system 20 will be described in greater detail hereinbelow.

Referring to FIG. 8, float attachment mechanism 400 will be described in greater detail. Float attachment mechanism 400 includes a base 410, an attachment plate 420, a securing screw 430, and a C-shaped clamp insert 440. Base 410 includes a cavity 412 defined within a lower portion 411 thereof. Cavity 412 may include a soda cap 414 fixedly disposed therein and configured to engage soda bottle 500, or may include threading disposed on an internal surface thereof for engaging soda bottle 500. Base 410 further includes an upper surface 416 positioned on an opposite end of base 410 relative to cavity 412. Upper surface 416 includes a protrusion 418 extending therefrom. Base 410 may be injection molded, or otherwise formed as a monolithic component from a substantially rigid polymer or other suitable material.

Attachment plate 420 is configured to be secured about upper surface 416 of base 410 and includes a slot 422 defined therein for receiving protrusion 418 of base 410. Attachment plate 420 further includes an extension 424 having an aperture (not explicitly shown) defined therethrough and configured to permit engagement of second end 320 of attachment line 300 (FIG. 7) to float attachment mechanism 400.

With continued reference to FIG. 8, C-shaped clamp insert 440 is formed from a resiliently flexible material and includes first and second fingers 442, 444. First finger 442 is configured to engage base 410, while second finger 444 is configured to engage attachment plate 420. Attachment screw 430 is threadingly engageable with both attachment plate 420 and base 410 to secure plate 420 to base 410 and to approximate first and second fingers 442, 444, respectively, of C-shaped claim insert 440 relative to one another upon tightening of attachment screw 430.

The use and operation of float system 20 will now be described with reference to FIG. 7. Initially, attachment line 300 is secured within first circular aperture 142 of locking clip 10 at first end 310 thereof. With reference to FIGS. 1-3, in conjunction with FIG. 7, in order to secure attachment line 300 to locking clip 10, sleeve 200 is slid axially along loop portion 100 of locking clip 10 toward second end 120 thereof until gap 133 is exposed adjacent first end 220 of sleeve 200. More specifically, as sleeve 200 is slid along longitudinal axis "A-A" (FIG. 1) toward second end 120 of locking clip 10, second end 230 of sleeve 200 eventually slides up over a portion of the substantially circular-shaped second end 120 of loop portion 100. As can be appreciated, the circular configuration of second end 120 of loop portion 100 inhibits sleeve 200 from fully sliding over second end 120 of loop portion 100, e.g., second end 120 exerts a resistive force on sleeve 200 urging sleeve 200 back toward intermediate section 130 but permits sleeve 200 to be slid sufficiently to expose gap 133 adjacent first end 220 of sleeve 200 to permit passage of attachment line 300 therethrough.

With sleeve 200 slid toward second end 120 of loop portion 100 of locking clip 10, as described above, the looped first end 310 of attachment line 300 may be inserted through gap 133 and into first aperture 142 of first end 110 of locking clip 10. Second end 320 of attachment line 300, on the other hand, may be secured to attachment plate 420 of float attachment mechanism 400 via any suitable mechanism, e.g., clipped, knotted, etc. Similarly as described above with respect to the rotational operation of locking clip 10, upon sliding of sleeve 200 toward second end 120 of loop portion 100, protrusion 137 of first intermediate segment 132 of loop portion 100 is disengaged from aperture 260 defined along first side 240 of sleeve 200 due to the relative translation of sleeve 200 with respect to loop portion 100. Accordingly, upon return of sleeve 200 to the initial position about intermediate section 130, e.g., to secure looped first end 310 of attachment line 300 about first end 110 of locking clip 10, protrusion 137 is re-engaged with aperture 137. More specifically, protrusion 137 may be configured to "pop" or "click" back into engagement with aperture 260, audibly and/or tactilely confirming to the user that the sleeve 200 has been returned to its initial, closed position.

Next, float 500 is threadingly engaged with base 410. More specifically, base 410 is configured to form a substantially fluid tight seal about float 500 when secure thereto. As can be appreciated, this configuration helps ensure that water does not leak into float 500, causing float 500 to sink. Further, it is envisioned that an illumination source (not shown), e.g., a glow stick, may be inserted into float 500 prior to securement to base 410, to allow the user to better visualize float 500 during use.

With continued reference to FIG. 7, securing screw 430 is then used to secure plate 420 and C-shaped clamp insert 440 to base 410. More specifically, at this point, securing screw 430 is tightened to sufficiently secure the components of float attachment mechanism 400 to one another, while also leaving a gap between first and second fingers 442, 444, respectively, of clamp insert 440. Thereafter, fishing line "L" may be clamped between fingers 442, 444 of clamp insert 440. In particular, a portion of fishing line "L" is positioned between fingers 442, 444 of clamp insert 440 and securing screw 430 is tightened further to approximate fingers 442, 444, thus frictionally retaining the portion of fishing line "L" therebetween. However, the frictional retention of fishing line "L" is sufficiently weak such that, when a fish is hooked on the end of the line "L," the line "L" is disengaged from between clamp insert 440 due to the downward force exerted on the line "L" by the fish and the opposed upward force exerted on the line "L" by the float 500, as the float 500 resists submersion.

As can be appreciated, the disengagement of the float 500 from the fixed position on the fishing line "L" also signals to the user that a fish has been hooked. However, although float 500 is disengaged from a fixed position along line "L," float 500 and float attachment mechanism 400 are not completely disengaged from line "L," but, rather, remain secured to the fishing line "L" via attachment line 300 and locking clip 10. Thus, float system 20 may be easily retrieved and reset for further use.

From the foregoing and with reference to the various figure drawings, those skilled in the art will appreciate that certain modifications can also be made to the present disclosure without departing from the scope of the same. While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed:
1. A locking clip for releasably securing at least one object thereon, the locking clip comprising:
a loop portion defining first and second ends interconnected by first and second intermediate segments, the first intermediate segment including a gap defined therein configured to permit passage of the at least one object therethrough for securing the at least one object to the loop portion; and
a sleeve disposed about the first and second intermediate segments of the loop portion between the first and second ends of the loop portion, the sleeve defining a first length along a first side thereof, a second length along a second side thereof, and an angled tip disposed at an end of the sleeve and angling from the first side thereof to the second side thereof, the first length being greater than the length of the gap and the second length being smaller than the length of the gap, the sleeve rotatable relative to the loop portion between a closed position, wherein the first side of the sleeve extends completely along a length of the gap to inhibit passage of the at least one object through the gap, and an open position, wherein the second side of the sleeve extends only partially along the length of the gap to permit passage of the at least one object through the gap;
wherein, at least one of the loop portion and the sleeve includes a feedback feature configured to produce at least one of an audible feedback response and a tactile feedback response when the sleeve is rotated to at least one of the closed position and the open position.

2. The locking clip according to claim 1, wherein the sleeve is rotatable approximately 180 degrees in either direction relative to the loop portion to transition the sleeve between the closed position and the open position.

3. The locking clip according to claim 1, wherein the sleeve includes at least one engagement member and wherein at least one of the first intermediate segment and the second intermediate segment includes a complementary engagement member configured to engage the engagement member of the sleeve upon rotation of the sleeve to at least one of the closed position and the open position to retain the sleeve in the at least one of the closed position and the open position.

4. The locking clip according to claim 3, wherein at least one of engagement between the engagement member and the complementary engagement member and disengagement between the engagement member and the complementary engagement member produces the at least one of the audible feedback response and the tactile feedback response.

5. The locking clip according to claim 3, wherein the engagement member of the sleeve is an aperture defined therein and wherein the complementary engagement member of the at least one of the first intermediate segment and the second intermediate segment is a protrusion configured for releasable engagement within the aperture.

6. The locking clip according to claim 1, wherein the first end of the loop portion defines a generally circular configuration having a first diameter.

7. The locking clip according to claim 6, wherein the second end of the loop portion defined a generally circular configuration having a second diameter.

8. The locking clip according to claim 7, wherein the second diameter is different from the first diameter.

9. The locking clip according to claim 1, wherein the at least one object is permitted to pass through the gap and into the first end of the loop portion when the sleeve is disposed in the open position.

10. The locking clip according to claim 1, wherein the first and second intermediate segments are generally linear.

11. The locking clip according to claim 10, wherein the first and second intermediate segments are generally parallel relative to one another.

12. The locking clip according to claim 1, wherein the loop portion is formed from a single piece of wire stock.

13. The locking clip according to claim 1, wherein the sleeve is formed from a non-corrosive material.

14. The locking clip according to claim 1, wherein the sleeve is formed from a flexible material.

15. The locking clip according to claim 1, wherein the sleeve is formed from a transparent material to permit a user to visually confirm a position of the sleeve relative to the loop portion.

16. The locking clip according to claim 1, wherein the feedback feature of the at least one of the loop portion and the sleeve produces both an audible feedback response and a tactile feedback response when the sleeve is rotated to at least one of the closed position and the open position.

17. A locking clip for releasably securing at least one object thereon, the locking clip comprising:
  a loop portion defining first and second ends interconnected by first and second intermediate segments, the first intermediate segment including a gap defined therein configured to permit passage of the at least one object therethrough for securing the at least one object to the loop portion; and
  a sleeve disposed about the first and second intermediate segments of the loop portion between the first and second ends of the loop portion, the sleeve rotatable relative to the loop portion between a closed position, wherein the sleeve extends completely along a length of the gap to inhibit passage of the at least one object through the gap, and an open position, wherein the sleeve extends only partially along the length of the gap to permit passage of the at least one object through the gap, the sleeve formed from a transparent material to permit a user to visually confirm a position of the sleeve relative to the loop portion;
  wherein, at least one of the loop portion and the sleeve includes a feedback feature configured to produce at least one of an audible feedback response and a tactile feedback response when the sleeve is rotated to at least one of the closed position and the open position.

18. The locking clip according to claim 17, wherein the sleeve is rotatable approximately 180 degrees in either direction relative to the loop portion to transition the sleeve between the closed position and the open position.

19. The locking clip according to claim 17, wherein the loop portion is formed from a single piece of wire stock.

20. The locking clip according to claim 17, wherein the at least one object is permitted to pass through the gap and into the first end of the loop portion when the sleeve is disposed in the open position.

* * * * *